United States Patent [19]
Bascope et al.

[11] 4,043,912
[45] * Aug. 23, 1977

[54] CLARIFICATION TANK

[75] Inventors: Alberto H. Bascope; Eugene H. Grizzard, both of Huntington Beach, Calif.

[73] Assignee: Burmah Oil and Gas Company, Houston, Tex.

[*] Notice: The portion of the term of this patent subsequent to Apr. 20, 1993, has been disclaimed.

[21] Appl. No.: 604,718

[22] Filed: Aug. 14, 1975

Related U.S. Application Data

[63] Continuation-in-part of Ser. No. 157,343, June 28, 1971, Pat. No. 3,951,816.

[51] Int. Cl.² .................. B01D 17/02; B01D 21/10
[52] U.S. Cl. .................. 210/83; 210/532 R; 210/537; 210/DIG. 25
[58] Field of Search .......... 210/83, 84, 519, 525, 210/532, 538, 539, 540, DIG. 25, 112, 114, 115, 533, 537

[56] References Cited

U.S. PATENT DOCUMENTS

| | | | |
|---|---|---|---|
| 2,307,154 | 1/1943 | Osuna | 210/525 X |
| 2,593,036 | 4/1952 | Koch | 210/519 X |
| 3,246,763 | 4/1966 | Baum | 210/519 X |
| 3,452,869 | 7/1969 | O'Neill | 210/84 |
| 3,552,571 | 1/1971 | Neuspiel | 210/525 X |
| 3,951,816 | 4/1976 | Bascope et al. | 210/519 |

*Primary Examiner*—William A. Cuchlinski, Jr.
*Attorney, Agent, or Firm*—Donald W. Canady

[57] ABSTRACT

A clarification tank having a plurality of pick-up trays and a central collection conduit which is connected to an externally located riser having a high volume discharge weir at the upper end thereof. The tank also includes a plurality of sand pan draw-offs connected to a collection piping system which permits gathering solid particulate matter from all of the sand pan drains in a single discharge line by hydrostatic pressure differential.

10 Claims, 4 Drawing Figures

CLARIFICATION TANK

RELATED APPLICATIONS

This application is a continuation-in-part application of Ser. No. 157,343, filed June 28, 1971, now U.S. Pat. No. 3,951,816, issued Apr. 20, 1976.

BACKGROUND OF THE INVENTION

1. Field of the Invention

Our invention relates to a clarification tank such as a flotation cell, a settling tank, or a holding tank, wherein a mixture of two or more liquid materials having different densities is allowed to settle to effect a gravity separation and the clarified liquid is removed from the bottom of the tank through a central collection plenum which is connected to an external riser.

There are many industrial uses for clarification tanks wherein a mixture of two or more liquids having different specific gravities are separated by what is basically a gravity settling process, wherein the lighter liquid material collects at the top of the liquid mixture and the heavier material settles to the bottom of the container housing the mixture. For example, such clarification techniques are used in the mining, metallurgical and chemical processing arts, and in the oil industry — both in refinery operations and crude oil production. Our present invention involves clarification tanks which are useful in each of the above operations, however, it is described herein with respect to crude oil production and waste water treatment required in production operations. In oil field water flooding operations, which are commonly used as a secondary recovery method for crude oil production, oil is produced by injection of water into an oil bearing sand formation to displace the oil and water in the sand formation towards adjacent wells through which it is brought to the surface. The oil thus produced is an oil-water mixture containing about 60% to 95% water, and the oil in such production mixtures is normally separated from the water by physical separation means, such as by settling tanks with the aid of emulsion breaking chemicals. The water separated from this mixture still contains on the order of 50 to 500 ppm oil. Consequently, this waste water is subjected to further clean-up operations to remove the residual 50–500 ppm oil prior to final disposal of the waste water or reuse in an industrial application. According to conventional practices, the residual small amount of oil is removed from the waste water in a flotation cell operation.

2. Description of the Prior Art

The separation of small amounts of oil from water in a flotation cell is accomplished by injecting air into the oil-water mixture under pressure and pumping the mixture into a retention tank and then introducing the pressurized mixture into the flotation cell at a point beneath the surface of the liquid. Such processing is described more fully in U.S. Pat. Nos. 3,576,738 and 3,725,264. As the mixture is released into the body of liquid in the flotation cell, the air in solution is released and bubbles through the body of the liquid in the cell and attaches to suspended oil particles which effectively reduces their specific gravity and causes the oil to collect near the surface of the liquid in the cell or tank where it can be skimmed off with a skimmer into a skimming trough.

The liquid level in a flotation cell is quite important and is controlled by manipulation of adjustable rings or weirs at the top of the water outlet risers to maintain the water level. According to the prior art, several water removal risers are spaced circumferentially around the tank. Hence the adjustment of the weirs at the top of the several risers must be done evenly as the water level is maintained, in order to prevent short circuiting or by-passing, that is, passage of the oil-water mixture directly from the inlet tube to one of the risers. The multiple riser system is difficult to adjust properly. The by-passing phenomena may occur to a lesser or greater degree, and has the effect of reducing the effective residence time in the flotation cell thus decreasing the quality of the water recovered from the cell since the air bubbles are not given sufficient opportunity to remove the residual oil by attaching to the oil particles and floating these oil particles to the surface. In addition, by-passing increases turbulence in the flotation cell, which also reduces oil removal capability.

Some of the prior art tank designs recognize the advantages in removing the clarified liquid at multiple points in the tank; however, the prior art systems using multiple pick-up points did not provide for equalization of the flow rate through the multiple pick-up conduits and thus did not obviate the operational problems discussed above, i.e. channeling and by-passing, which problems are inherent in the use of multiple pick-up conduits through which the liquid is removed at different flow rates.

The risers in prior art flotation cells, typically, are open to the inside of the tank and this arrangement increases the likelihood of by-passing.

Accurate liquid level control is also essential since too high a level will pass water with the skimmed oil. Liquid level control is accomplished in the prior art by removing adjustable rings in the top of water removal risers, as mentioned above or by using compartmented weir boxes such as those shown in U.S. Pat. No. 3,246,763. Compartment weir boxes are limited in the volume of water which can be removed with a given size weir box since water is removed effectively from only one opening.

According to the prior art, sand and sediment carried into the flotation cell with the oil-water mixture to be separated, are removed from the flotation cells by providing a conical bottom surface in the cell or tank and a rotary sweep to move the sand and sediment to an outlet for removal.

According to the present invention, sand and sediment are removed from the tank by providing a series of sand pan draw-offs through which sand and sediment are removed to a central collection line hydrostatic pressure differential.

SUMMARY OF THE INVENTION

Our present invention relates to a clarification tank such as a flotation cell. More specifically, our invention relates to an apparatus for removing the clarified liquid from an area adjacent to the bottom of the tank and the means associated with the water removal apparatus for controlling the liquid level in the tank.

It is an object of our present invention to provide a clarification tank which facilitates liquid level control with a single riser.

It is also an object of our present invention to provide a clarification tank wherein by-passing or short circuiting of the feed mixture to the outlet is minimized by removing clarified liquid through multiple pick-up pipes into a central plenum.

It is a further object of our invention to provide a clarification tank with multiple pick-up points for the clarified liquid, and wherein the liquid removal flow rate from each of such points is substantially equal.

According to our present clarification tank design, water is removed from the cell or tank adjacent to the bottom thereof, through a series of pick-up conduits which are connected to a central collection plenum which is connected to an external vertical riser through which the clarified water is removed from the central collection plenum. The upper end of the vertical riser is provided with a weir assembly which is vertically adjustable so that the liquid level in the clarification tank can be accurately controlled by adjustment of a single weir. The weir device at the upper end of the riser is positioned over the top of the riser tube to discharge water to an outlet tube for removal of the clarified water. Sand and other solid particles which settle to the bottom of the cell, are withdrawn from the tank by several sand pan draw-offs which are connected to a central collection line.

DESCRIPTION OF THE PREFERRED EMBODIMENT

Our present invention is illustrated and described herein with specific reference to a flotation cell designed for the separation of small amounts of oil from water recovered from oil field water-flooding operations, although our present invention is also applicable to apparatus for separating other liquid mixtures.

Figure 1:
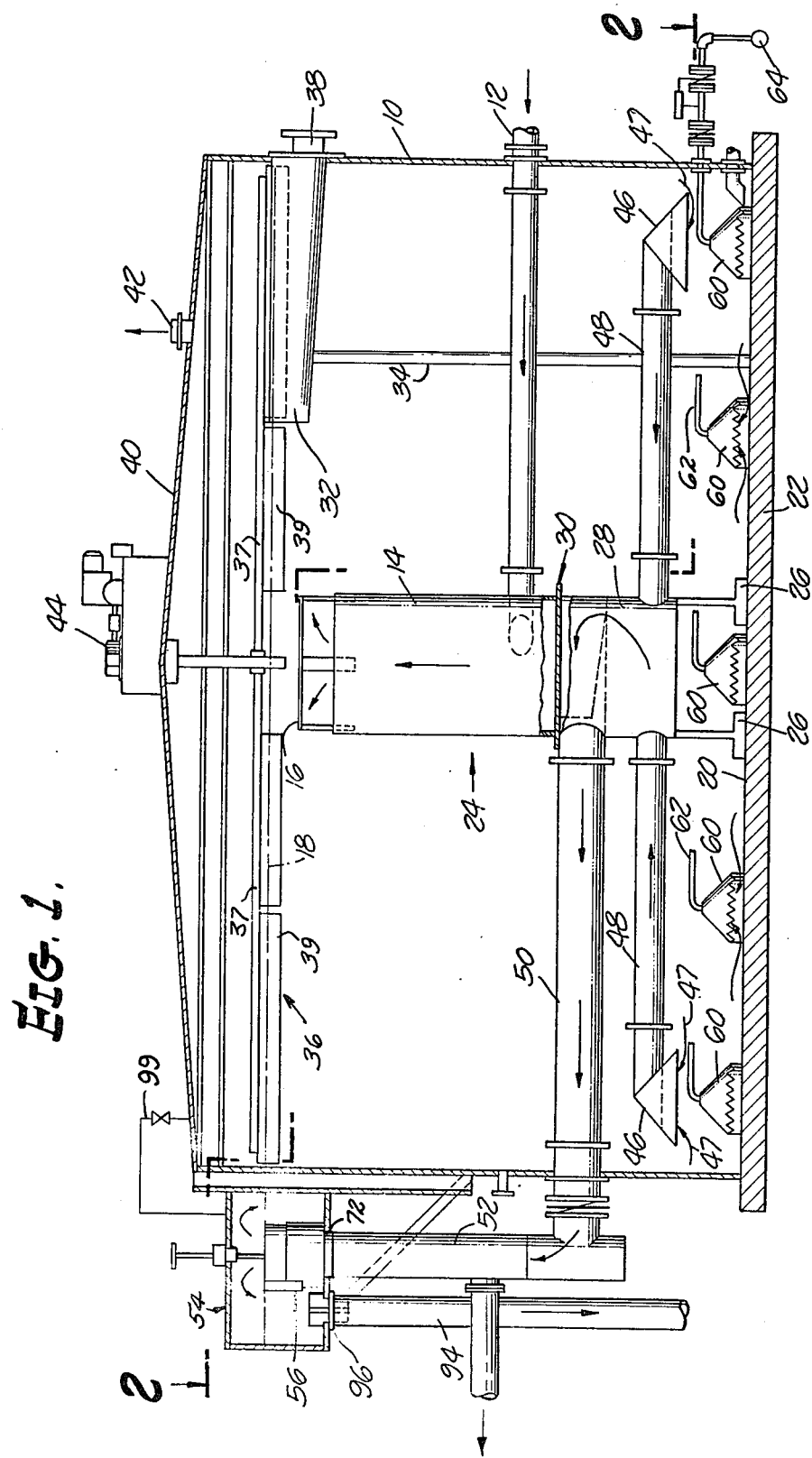
FIG. 1 shows, in partial cross section, a clarification tank (flotation cell) used for removing relatively small amounts of oil from partially separated oil field water.

With reference to the apparatus shown in FIG. 1, the waste water (oil-water mixture) to be clarified is fed into the tank or flotation cell 10 through inlet pipe 12. The waste water is fed into the tank to an inlet column 14 and is released therein so that the air coming out of solution forms bubbles which rise in the column 14 and attach to oil particles to effect separation of the oil by flotation of the oil to the surface where it forms a sludge layer at the surface 18 of the liquid in tank. The waste water feed material passes out of the upper end of the column 14 as shown by arrows at the upper end of the column, and moves outwardly under cover plate or top 16. The oil particles, due to their lower specific gravity and entrainment with bubbles, move upwardly towards the liquid level 18 and there is a progressively decreasing oil content from the liquid level 18 to the bottom 20 of the flotation cell. Accordingly, purified water is removed from a point adjacent the bottom of the tank as indicated by arrows 47, and the oil is removed as a sludge adjacent the liquid level 18 in the tank, as will be discussed hereinafter.

The tank 10 is mounted on a base pad 22, and the collection plenum 28 is positioned centrally within the tank and mounted therein on support pads 26. The inlet column 14 may, for convenience, also be positioned centrally within the tank and supported on, or on the same support structure as, the collection plenum 28, although these chambers may be separately supported structures. As shown in FIG. 1, the inlet column 14 and the collection plenum 28 may be constructed as a unit 24. The unit 24 is divided into an upper plenum chamber 14 which functions as the inlet column, and a lower plenum chamber or collection plenum 28 and the two plenums are separated by a solid horizontal baffle plate 30.

Oil is removed from the surface of the liquid into a sludge basin 32 which is supported by sludge basin support 34 so that its top is approximately ½ inch above the upper surface of the liquid in the tank. Because of the corrosive nature of the liquid in the tank (hot salt water saturated with air and containing $H_2S$ and sand) the sludge basin is preferably constructed of reinforced fibre glass plate. A dual sweeparm rotary skimmer 36 is employed to move the sludge from the entire surface of the tank, into the sludge basin with a rotary sweep. The skimmer comprises a dual sweep arm 37 with a dual wiper blade 39 which is split to permit sweeping past the guide end of the sludge basin. The rotary skimmer is driven with a motor drive unit 44. The sludge is removed through the sludge basin drain 38. The flotation cell 10 has a roof 40 over the entire tank 10 including the sludge basin. The roof is vented at 42 and the weir box assembly 54, which is also vented, may be vented into the tank roof 40 as shown at 99 in FIG. 1.

Figure 2:
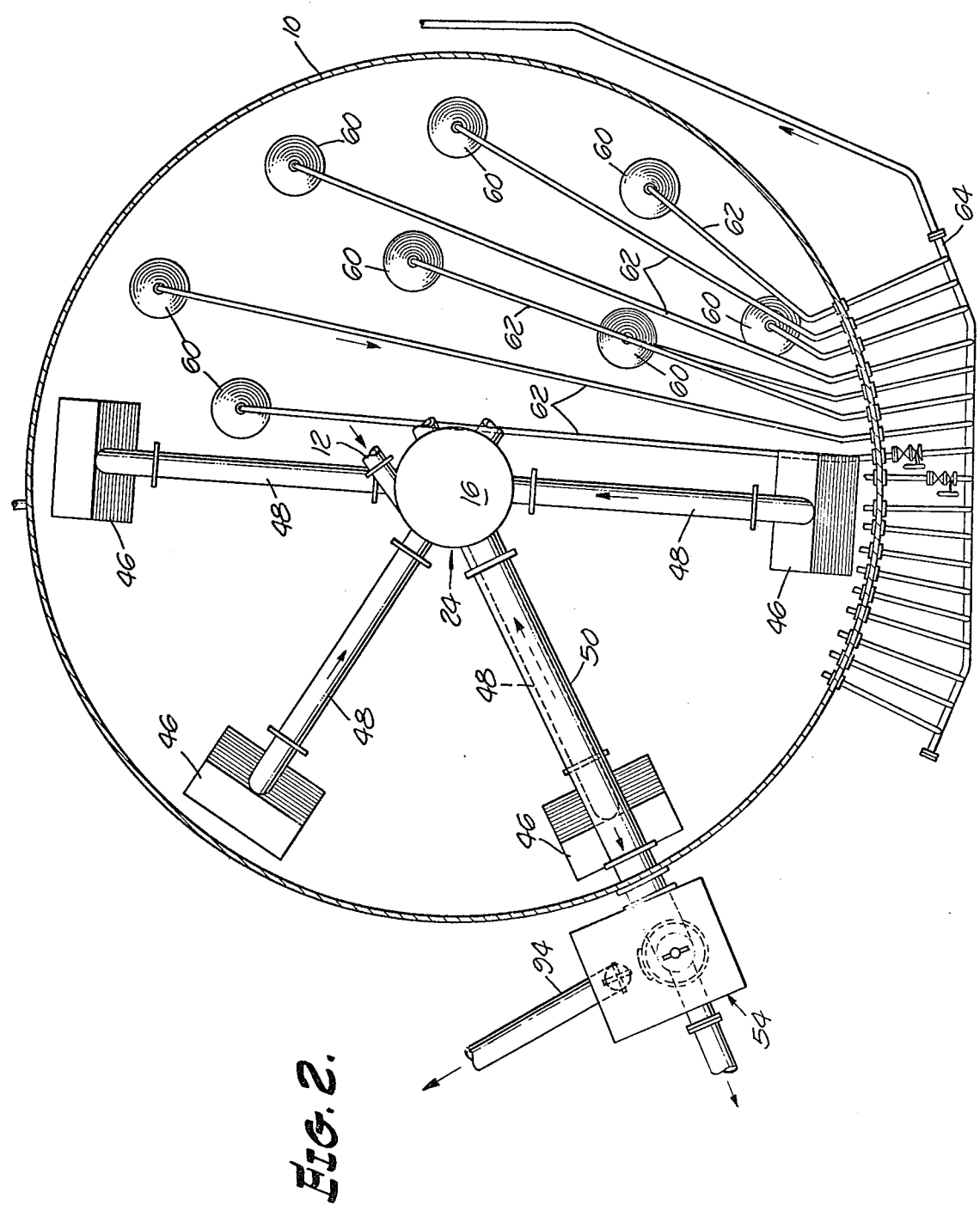
FIG. 2 is a plan view, partially in section, taken on line 2—2 of FIG. 1 showing the relative positions of the inlet column, the pick-up trays, the sand pan draw-offs, the removal line, and the weir box.

Clean water is removed from the flotation cell 10 through a series of pick-up trays 46 which are circumferentially spaced within the tank and connected to the central collection plenum with conduits pipes 48. The clean water flows in through the pick-up trays 46 and through the pipes 48 into the central collection plenum 28, and then through outlet 50 into the single vertical riser pipe 52. The pick-up conduits are so designed and related to the central collection plenum as to cause equal flow rates through each of the pick-up trays, since unequal flow rates cause channeling and/or by-passing of unclarified liquid into the collection plenum through the higher flow rate pick-up trays. Preferably, to effect equalization of flow rate, the pick-up conduits are of equal length and internal diameter, and are symmetrically arranged around a central collection plenum, as shown in FIGS. 1 and 2. The pick-up trays 46 are arranged with bottom openings, so that settling sand, sediment, etc., will not be carried along with the clean water as it is removed from the tank. The clarified water is withdrawn in the direction of the arrows 47 (FIG. 1). The shape of the pick-up trays and their arrangement in the tank are also shown in the plan view, FIG. 2.

Figure 4:
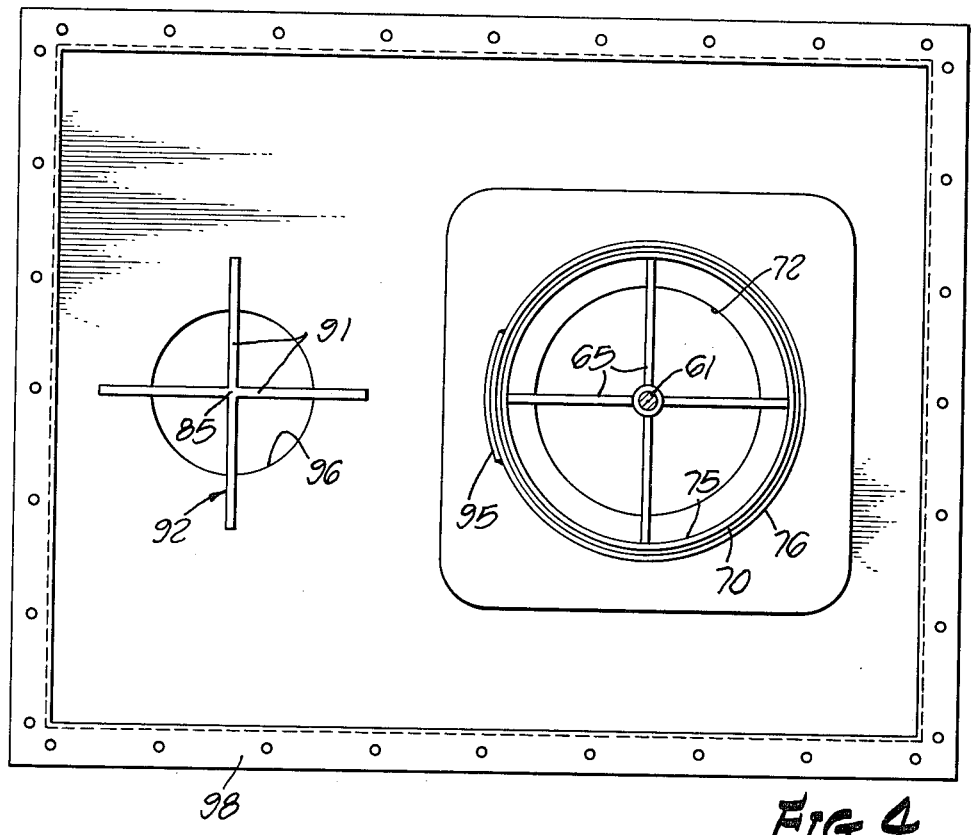
FIG. 4 is an enlarged plan of the weir assembly illustrated in FIG. 3, with the cover plate removed.
Figure 3:
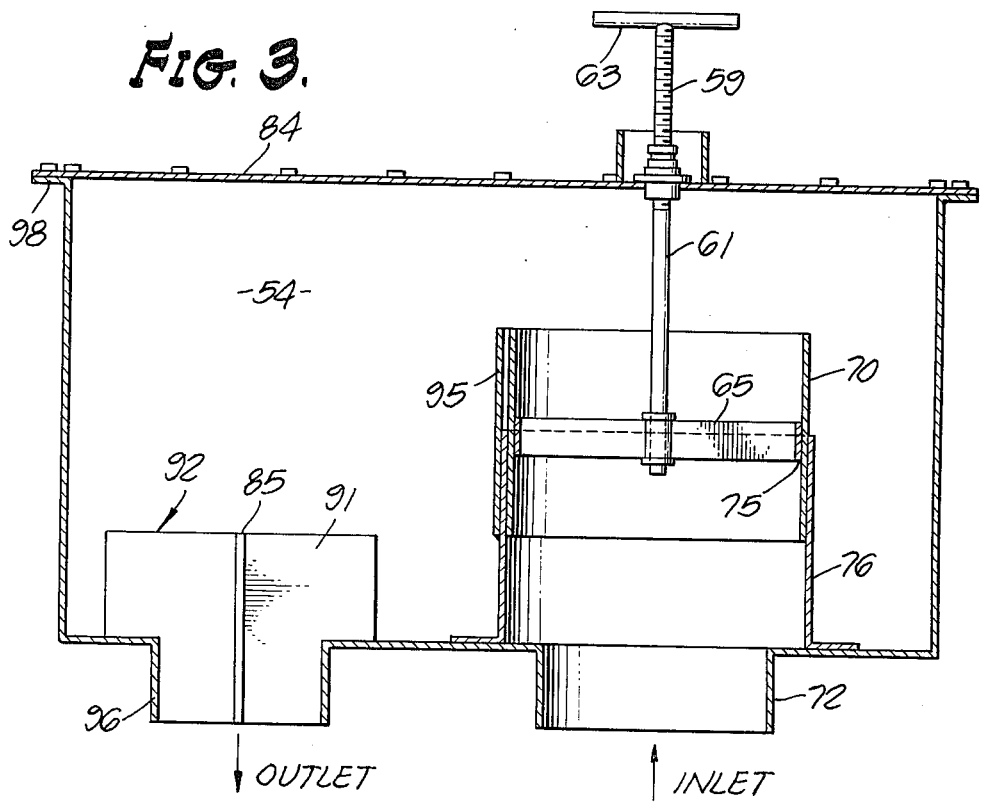
FIG. 3 is an enlarged cross sectional view of the weir assembly shown on the clarification tank illustrated in FIG. 1.

The upper end of the riser pipe 52 extends into weir box 54 where the clean water is removed from the flotation cell system and the liquid level 18 in the flotation cell 10 is controlled. Riser pipe 52 extends into the lower piping 72 of weir box 54 which is provided with a vertically movable sleeve 70 as shown in FIG. 4. Sleeve 70 is vertically movable with thread drive 59 which is manually lifted or lowered within the fixed pipe 76 to different levels to thereby control the discharge rate of clarified water from the tank 10 and also the liquid level in the tank. As best viewed in FIG. 3, the movable sleeve 70 is affixed to the lower end of bolt 61 and is moved upward or downward as the handle 63 is rotated. Bolt 61 is fastened to sleeve 70 with a cross brace 65 and a support ring 75. The level at which the water is released from the weir, controls the level of the liquid in the tank 10 since the riser 52 is in effect a leg of manometer and the liquid surface level of the tank 10 is the other leg of the manometer.

The clean water overflowing the movable sleeve 70 of the weir box is removed therefrom through pipe 94 which is connected at its upper end 96 to the weir box. The outlet opening piping 96 of the weir box is provided with a vortex breaker 92 and comprises two or more plates 91 joined at the center 85 of the outlet and positioned in the upper end 96 of outlet pipe 94. A fixed baffle 95 is joined to the pipe 76 to prevent discharge from the inlet from flowing directly into the outlet pipe 94. The top 84 of the weir box is bolted to flange 98 of the weir box.

The solids which are carried into the tank with the waste water are removed from the tank at the flat bottom 20 thereof through sand pan draw-offs 60 which are connected through line 62 to a single collector pipe 64. As shown in plan view FIG. 2, the sand pan draw-offs are spaced throughout the tank at the bottom thereof.

While our present invention has been described herein with reference to a preferred embodiment with a certain degree of particularity, it is to be understood that our invention is not limited to the details or embodiments set forth, but rather should be afforded the full scope of the appended claims.

We claim as our invention:

1. An apparatus for clarifying a liquid mixture of two liquid components, comprising:
   a. a tank;
   b. means for feeding said liquid mixture into said tank below the liquid surface level, for gravity separation of said mixture in said tank whereby said lighter component separates from said mixture and rises toward the liquid surface level in said tank leaving said heavier component relatively pure in the lower portion of said tank;
   c. means in said tank for removing said lighter component at the liquid surface level in said tank;
   d. a central collection plenum for removing said clarified heavier component from below the level of said tank where said heavier component is substantially free of said lighter component;
   e. a plurality of pick-up conduits in said tank in fluid communication with said central collection plenum and extending radially therefrom in said tank; said pick-up conduits each being of equal length and equal internal diameter;
   f. means exterior of said tank and in fluid communication with said central collection plenum for controlling the rate of discharge of said heavier component from said tank.

2. The apparatus of claim 1 in which said pick-up conduits are arranged symmetrically around said central collection plenum.

3. The apparatus of claim 1 wherein said exterior discharge control means comprises a weir assembly having an inlet pipe therein and a vertically movable sleeve operably disposed in said inlet pipe for controlling the rate of discharge from said tank through said weir assembly.

4. The apparatus of claim 1 wherein said mixture feeding means and said collection plenum are housed in a unitary structure within said tank.

5. The apparatus of claim 1 including a plurality of downwardly facing solids removal means near the bottom of said tank, and a central collection system for withdrawing said solids from said removal means.

6. An apparatus for clarifying a liquid mixture of two liquid components, comprising:
   a. a tank;
   b. means for feeding said liquid mixture into said tank below the liquid surface level for gravity separation of said mixture in said tank whereby said lighter component separates from said mixture and rises toward the liquid surface level in said tank leaving said heavier component relatively pure in the lower portion of said tank;
   c. means in said tank for removing said lighter component at the liquid surface level in said tank;
   d. a central collection plenum for removing said clarified heavier components from below the liquid surface level in said tank at a point where said heavier component is substantially free of said lighter component;
   e. a plurality of pick-up conduits in said tank operably connected to said collection plenum and extending radially therefrom in said tank, said pick-up conduits being arranged and constructed symmetrically about said collection plenum to withdraw said heavier component into said pick-up conduits at substantially equal flow rates; and
   f. means exterior of said tank and in fluid communication with said collection plenum for controlling the rate of discharge of said heavier component from said tank.

7. An apparatus for clarifying a liquid mixture of two liquid components, comprising:
   a. a tank;
   b. means for feeding said liquid mixture into said tank below the liquid surface level, for gravity separation of said mixture in said tank whereby said lighter component separates from said mixture and rises toward the liquid surface level in said tank leaving said heavier component relatively pure in the lower portion of said tank;
   c. means in said tank for removing said lighter component at the liquid surface level in said tank;
   d. a central collection plenum for removing said clarified heavier component from below the liquid surface level of said tank where said heavier component is substantially free of said lighter component;
   e. a plurality of pick-up conduits in said tank extending radially from said central collection plenum, said conduits being arranged and constructed to withdraw said heavier component into said pick-up conduits at substantially equal flow rates;
   f. A riser positioned exteriorly of said tank;
   g. a pipe extending between said riser and said collection plenum for conveying fluid from said collection plenum to said riser; and
   h. means at the upper end of said riser for controlling the rate of discharge of said clarified heavier component from said tank.

8. In an apparatus for clarifying a liquid mixture of two liquid components in a tank having means associated with said tank for feeding said liquid mixture into said tank below the liquid surface level for gravity separation of said mixture in said tank whereby said lighter component separates from said mixture and rises toward the liquid surface level in said tank leaving said heavier component relatively pure in the lower portion of said tank, and means in said tank for removing said lighter component at the liquid surface level, the improvement comprising:
  a. a collection plenum centrally disposed within said tank for removing said clarified heavier component from below the liquid surface level of said tank in an area where said heavier component is substantially free of said lighter component;
  b. plurality of pick-up conduits in said tank operably connected to said collection plenum and extending radially therefrom symmetrically about said collection plenum to withdraw said heavier component from said area into said pick-up conduits at substantially equal flow rates; and
  c. a flow control device positioned exteriorly of said tank and in fluid communication with said collection plenum, for controlling the rate of said heavier component removal from said tank through said plurality of pick-up conduits.

9. In a method for clarifying a liquid mixture of two liquid components in a tank having means for feeding said liquid mixture into said tank below the liquid surface level for gravity separation of said mixture in said tank, whereby said lighter component separates from said mixture and rises toward the liquid surface level in said tank leaving said heavier component relatively pure in the lower portion of said tank, comprising the steps:
  a. skimming the lighter component from the liquid surface of said mixture;
  b. removing said clarified heavier component from said tank through a plurality of conduits extending radially into a central collection plenum, at substantially equal flow rates through each of said conduits;
  c. removing said heavier component from said tank through said collection plenum; and
  d. controlling the rate of said removal from said tank.

10. The method of claim 9 wherein said rate of removal is controlled by a single control device exterior to said tank.

* * * * *